Feb. 21, 1956 H. W. SCHAUFELBERGER 2,735,319
WIRE STRIPPING SCISSORS
Filed July 3, 1952
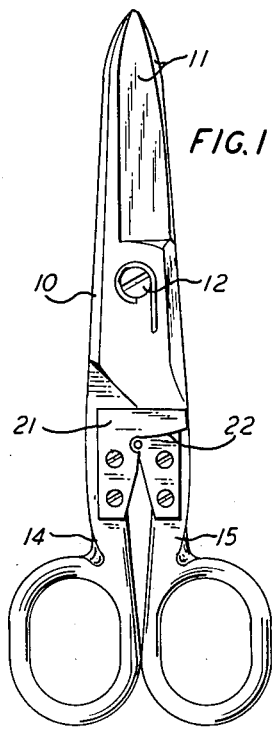
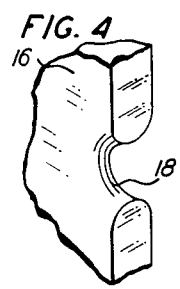
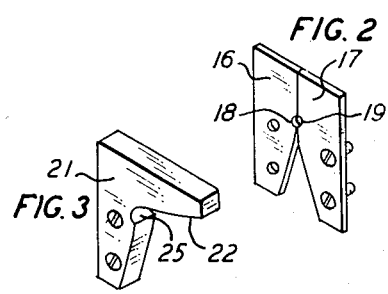
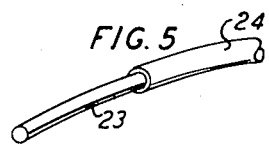
INVENTOR
H. W. SCHAUFELBERGER
BY
*W.C. Parnell*
ATTORNEY

United States Patent Office 2,735,319
Patented Feb. 21, 1956

2,735,319

WIRE STRIPPING SCISSORS

Henry W. Schaufelberger, Union, N. J., assignor to Western Electric Company, Incorporated, New York, N. Y., a corporation of New York Application July 3, 1952, Serial No. 297,108

2 Claims. (Cl. 81—9.5)

This invention relates to scissors and more particularly to attachements therefor for stripping covering from wire.

In the manufacture and installation of telephone equipment it is frequently necessary to remove insulation or other coverings from wire. Due to the fact that scissors are also required for various purposes, it is to an advantage to combine wire stripping means with the scissors. This, however, presents a problem of protecting the wire against any possibility of being damaged in other portions of the scissors during movement of the members thereof from open to closed positions.

An object of the present invention is a particular type of scissors adapted to efficiently remove insulation coverings from wires.

With this and other objects in view, the invention comprises scissors having stripping elements mounted on the handle portions with companion recesses therein to close about a covered wire and cooperating with a guide mounted on one of the handle portions to assure positioning of the wire in the recesses.

In the present embodiment of the invention, the recesses in the stripping elements have cross-sectionally curved surfaces adapted to close about the wire and pinch the covering in two for stripping a given portion from the wire free of damage to the wire. The guide also has an arcuate surface disposed adjacent the recesses at all times during opening and closing of the handle portions to assure positioning of the wire in the recesses.

Other objects and advantages will be apparent from the following detailed description when considered in conjunction with the accompanying drawings, wherein:

Fig. 1 is a side elevational view of a given type of scissors illustrating the invention;

Fig. 2 is an isometric view of the stripping elements;

Fig. 3 is an isometric view of the guide;

Fig. 4 is an enlarged fragmentary isometric view of one of the stripping elements illustrating the contour of the recesses therein; and Fig. 5 is an isometric view of a portion of a covered wire after a lenth of the insulation has been removed therefrom.

Referring now to the drawing, attention is first directed to Fig. 1 which illustrates a given type of scissors 10 having the conventional cutting portions 11 pivoted at 12 and having handle portions 14 and 15 adapted to engage each other when the scissors are in the closed position shown.

Stripping elements 16 and 17 having recesses 18 and 19 are mounted on their respective handle portions 14 and 15. The recesses 18 and 19 have cross-sectionally curved surfaces as shown in Fig. 4 providing an opening, when the stripping elements are closed, of a diameter substantially equal to but not less than the diameter of the wire which is to be stripped of its insulation.

A guide 21 is mounted on the handle portion 14 and extends transversely of the space between the handle portions when the scissors are in open position to bar movement of the wire into engagement with the shearing portions. The guide 21 is also disposed adjacent the striping element 16 and has a surface 22 so disposed arcuately about the pivot 12 closely adjacent the recesses 18 and 19, that a wire 23 with an insulated covering 24 may be moved into engagement with the surafce and guided thereby into the recesses during closing of the scissors. The inner end of the surface 22 continues into a reverse arcuate surface 25 concentric with the recess 18 to further assist in guiding the insulated wire into the recesses 18 and 19.

Considering now the function of the scissors, it will be apparent that the cutting blades 11 may be employed in any desired manner and that the stripping elements may function to strip insulation from covered wires. With the guide 21 present during opening and closing of the scissors to strip insulation from wires, the wires are not only held away from the dangerous portions of the scissors, but are accurately positioned in the grooves for stripping the covering therefrom. Without the guide it would be diffucut to align the wires with the recesses and it would be possible to position the wires beyond the recesses where the wires may be cut or otherwise damaged during closing of the adjacent portions of the scissors. Furthermore, the rounded or cross-sectionally curved portions of the recesses 18 and 19 assure pinching of the coverings 24 in two so that the desired lengths may be removed readily without damage to the wire at the portion where the stripping elements initially close on the wire or throughout the portion of the wire from which the insulation is stripped.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

1. A wire stripping unit for a pair of pivotal scissors comprising members mounted for movement into open and closed positions about a pivot and having companion recesses in adjacent surfaces to close about a covered wire and remove a desired length of the covering from the wire during relative movement of the closed members and the wire, and a guide mounted on one of the members and having a projection extending transversely of the space between the members when in open positions to bar movement of the wire beyond the recesses, the projection having a surface extending arcuately about the pivot and touching the recesses at all times to assure positioning of the wire in the recesses.

2. A wire stripping unit for a pair of pivotal scissors comprising members mounted for movement into open and closed positions about a pivot and having companion recesses in adjacent surfaces thereof with cross-sectionally curved surfaces adapted to close about a covered wire and pinch the covering in two for stripping a given length of the covering from the wire free of damage to the wire, and a guide mounted on one of the members and having a projection extending transversely of the space between the members when in open positions to bar movement of the wire beyond the recesses, the projection having a surface extending arcuately about the pivot and touching the recesses at all times to assure positioning of the wire in the recesses.

References Cited in the file of this patent

UNITED STATES PATENTS

| 422,670 | Wallace | Mar. 4, 1890 |
| 1,388,398 | Adams | Aug. 23, 1921 |
| 1,597,646 | Ziegler | Aug. 24, 1926 |
| 1,814,589 | Endsley | July 14, 1931 |